(12) United States Patent
Marchand et al.

(10) Patent No.: US 6,738,243 B2
(45) Date of Patent: May 18, 2004

(54) APPARATUS AND METHOD FOR SERVICING A DISTRIBUTION BUS

(75) Inventors: Francois J. Marchand, Pittsburgh, PA (US); James L. Lagree, Robinson Township, PA (US); Joseph Jacob Matsko, Beaver, PA (US); Norman Davies, Murrells Inlet, SC (US); Richard Arthur Johnson, Aliquippa, PA (US)

(73) Assignee: Eaton Corporation, Cleveland, OH (US)

( * ) Notice: Subject to any disclaimer, the term of this patent is extended or adjusted under 35 U.S.C. 154(b) by 255 days.

(21) Appl. No.: 10/013,188

(22) Filed: Dec. 7, 2001

(65) Prior Publication Data

US 2003/0107853 A1 Jun. 12, 2003

(51) Int. Cl.$^7$ ................................................. H02H 7/00
(52) U.S. Cl. ......................................................... 361/62
(58) Field of Search ............................. 361/42, 62, 115, 361/604

(56) References Cited

U.S. PATENT DOCUMENTS

| | | | |
|---|---|---|---|
| 3,930,188 A | * 12/1975 | Olsen et al. | ................ 361/618 |
| 4,933,519 A | 6/1990 | Milianowicz et al. | |
| 5,001,599 A | * 3/1991 | Itou et al. | ................... 361/604 |

* cited by examiner

*Primary Examiner*—Gregory J. Toatley, Jr.
*Assistant Examiner*—Boris Benenson
(74) *Attorney, Agent, or Firm*—Martin J. Moran

(57) ABSTRACT

Protection is provided for servicing a distribution bus by grounding the line side of a circuit breaker through which the distribution bus is fed and then closing the circuit breaker. The trip unit of the circuit breaker includes logic, in addition to the normal protection logic, which opens the circuit breaker main contacts without delay if current is detected upon closing of the grounded circuit breaker. However, if the grounded circuit breaker has been closed for a selected period of time and then current is detected, the distribution bus is kept at zero potential by not operating the breaker. A breaker auxiliary switch with a mechanical delay provides the indication of the selected time interval after closing the circuit breaker.

9 Claims, 5 Drawing Sheets

| SELECTOR SWITCH | SAMPLE | AUX SWITCH STATUS | CURRENT SENSED | TRIP |
|---|---|---|---|---|
| 0000 OPEN | 0 (POWER UP) | 0000 OPEN | 0 | NO |
| 0001 NO CHANGE | 1 | 0001 NO CHANGE | YES | NO |
| 0011 NO CHANGE | 2 | 0011 NO CHANGE | YES | NO |
| 0111 NO CHANGE | 3 | 0111 NO CHANGE | YES | NO |
| 1111 CLOSED | 4 | 1111 CLOSED | YES | YES |

*FIG. 3*

| SELECTOR SWITCH | SAMPLE | AUX SWITCH STATUS | CURRENT SENSED | TRIP |
|---|---|---|---|---|
| 0000 OPEN | 0 (POWER UP) | 0000 OPEN | 0 | NO |
| 0001 NO CHANGE | 1 | 0000 OPEN | YES | NO |
| 0011 NO CHANGE | 2 | 0000 OPEN | YES | NO |
| 0111 NO CHANGE | 3 | 0000 OPEN | YES | NO |
| 1111 CLOSED | 4 | 0000 OPEN | YES | NO |

*FIG. 5*

APPARATUS AND METHOD FOR SERVICING A DISTRIBUTION BUS

BACKGROUND OF THE INVENTION

1. Field of the Invention

This invention relates to arrangements for providing protection to personnel servicing a distribution bus. In particular, it relates to apparatus and a method of grounding the distribution bus using a circuit breaker.

2. Background Information

It has been common to provide protection for workers servicing a distribution bus to include an earthing switch between the circuit breaker connecting the distribution bus to a main bus so that the distribution bus may be grounded. In some installations, it is now known to place the earthing switch on the line or main bus side of the circuit breaker. However, the earthing switch and not the circuit breaker is used to complete the connection to ground.

The earthing switch is used during servicing to remove voltage from the distribution bus. However, there could be a back feed to the distribution bus. For example the distribution bus could be double fed, there could be a back fed transformer on the distribution bus, or there could be other errors.

Current requirements call for the earthing switch to be able to close in on two faults and still operate. However, under a new requirement the earthing switch will have to close in on five faults and still operate.

Closing in on a fault causes an arc. The arc in turn causes melting of the contact material which can result in welding of the contacts. If the contacts are not opened while the metal is still fluid, a rough surface is produced. The voltage concentrations caused by the spikes on the now rough surface result in an even earlier striking of the arc the next time and can lead to permanent welding of the contacts. The copper air blade switches normally used as earthing switches can not satisfy the five fault closing requirement. They will weld or be destroyed. It is too expensive to develop a specialized selector switch which could close in on a fault five times and still function.

Circuit breakers are made to close in on high currents, but even they suffer deterioration of the contacts over multiple high current closings. This is true even on vacuum interrupters which can stand much higher currents than air blade switches. It is common practice with circuit breakers to trip immediately upon closing into a fault. Thus, the metal is still molten and forms a smooth surface after contact separation. It is also common for a circuit breaker to have an auxiliary switch which provides an indication of the open/close state of the main contacts. In some cases, these auxiliary breaker switches have a time delay. The time delay is used to prevent tripping of the circuit breaker when closing to allow other breakers down stream to respond to a fault upon closing of the breaker.

There is room for improvement in providing protection for personnel servicing a load in an electric power distribution system.

SUMMARY OF THE INVENTION

This invention is directed to protecting personnel servicing an electric power system through the use of a ground selector switch and a circuit breaker with intelligence. The ground selector switch in connected in series with the circuit breaker between the main bus and the distribution bus on the main bus side of the circuit breaker. The ground selector switch is moved to the ground position with the main contacts of the circuit breaker open. The main contacts of the circuit breaker are then closed. If the circuit breaker is closed in on a current, an unsafe condition exists and the main contacts are opened without any intentional delay. On the other hand, if the distribution bus has been connected to ground, that is the ground selector switch is in the ground position and the circuit breaker has been closed for a selected period of time before current flows, the main contacts of the circuit breaker are not opened. This is done to maintain the ground state of the distribution bus previously established. Under these conditions, other devices in the system should respond to the current.

More particularly, the invention is directed to a method of providing protection for servicing a distribution bus connected to a main bus through main contacts of a circuit breaker comprising the steps of: connecting the circuit breaker to ground between the main contacts and the main bus, closing the main contacts of the circuit breaker, and opening the main contacts without delay when current flows through the main contacts within a selected time period after the closing of the main contacts. The method further includes blocking opening of the main contacts if current begins to flow through the main contacts only after the selected time period after the main contacts have been closed with the circuit breaker connected to ground between the main contacts and the main bus. In this latter case, a warning signal is provided indicating the no trip condition.

The invention is also directed to apparatus for providing protection when servicing a distribution bus fed from a main bus comprising a circuit breaker having main contacts and connected to the distribution bus. An earthing switch is connected to the circuit breaker and to the main bus. The earthing switch has a first condition in which the circuit breaker is connected to the main bus and a second condition in which it is connected to ground. The circuit breaker includes a protection circuit, which is operative with the earthing switch in the second condition, that is connected to ground, to open the main contacts of the circuit breaker only if current flows through the main contacts within a selected time period after the main contacts close. The protection circuit can include an auxiliary switch having a first condition when the main contacts are open and switching to a second condition the selected time after the main contacts close. The protection circuit further includes a current detector detecting current flowing through the closed main contacts and a trip circuit responsive to the earthing switch being in the second condition with the auxiliary switch in the first condition, and the detection of current by the current detector to generate a trip signal without delay. The circuit breaker also includes an operating mechanism for opening the main contacts in response to the trip signal. Preferably, the trip circuit includes means periodically sampling the condition of the earthing switch, the condition of the auxiliary switch and the current detected by the current detector and generating a trip signal only after a predetermined number of samples in which the earth switch is in the second condition, the auxiliary switch is in the first condition and current is detected. The predetermined number of samples is selected so that it occurs in less than one cycle of the current and preferably in about one half cycle. The trip circuit can be operated by the current detected by the current detector.

BRIEF DESCRIPTION OF THE DRAWINGS

A full understanding of the invention can be gained from the following description of the preferred embodiments when read in conjunction with the accompanying drawings in which:

FIG. 3 illustrates the progressive status of certain parameters for the conditions of FIG. 2.

FIG. 5 is similar to FIG. 3 but for the conditions of FIG. 4.

DESCRIPTION OF THE PREFERRED EMBODIMENTS

Figure 1:
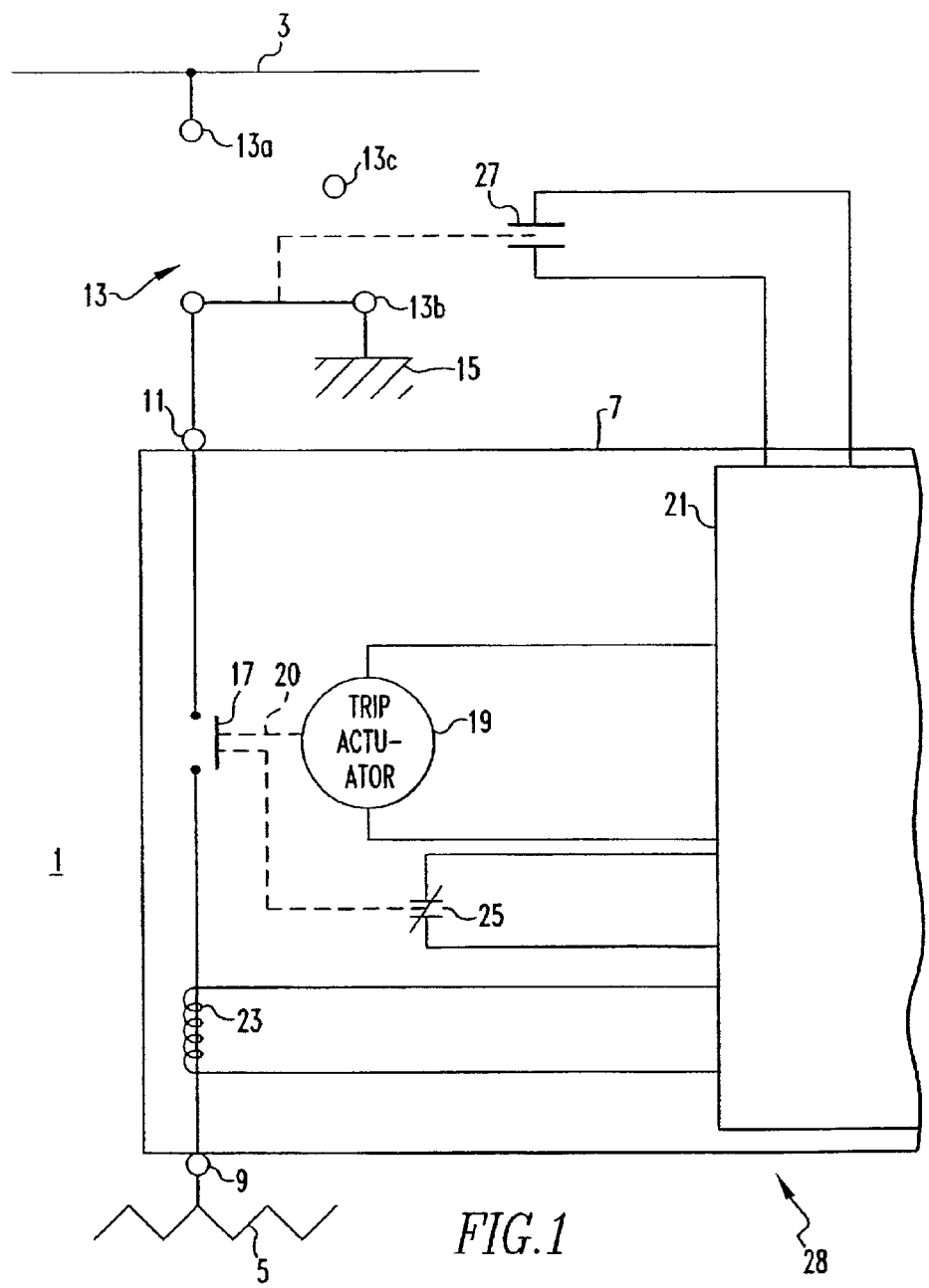
FIG. 1 is a schematic diagram of an electric power system incorporating the invention.

FIG. 1 illustrates an electric power system 1 which includes a main bus 3 feeding a distribution bus 5 which in turn supplies power to loads (not shown). A circuit breaker 7, such as a medium voltage vacuum interrupter, has load terminals 9 connected to the distribution bus 5 and line terminals 11 which are connected in series with a ground selector switch 13 to the main bus 3. This ground selector switch 13 has a first condition in which it is connected through a terminal 13a to the main bus, a second condition in which it is connected through a second terminal 13b to earth 15, and third condition in which is connected to an open terminal 13c.

The circuit breaker 7 has main contacts 17 which can be automatically opened by a trip actuator 19 of an operating mechanism 20. The circuit breaker also includes intelligence in the form of a trip unit 21 which senses a current flowing through the main contacts through a current detector 23. This trip unit 21 can be energized by the current sensed by the current detector, and hence, does not become operative unless current is flowing through the circuit breaker 7.

The circuit breaker has an auxiliary switch 25 which provides a signal indicating the open/closed state of the main contacts 17. This auxiliary switch 25 is closed when the main contacts 17 are open and it has a mechanical delay in opening upon closing of the main contacts 17. This delay is short enough to prevent damage if the circuit breaker closes in on a fault, but long enough to confirm the unsafe condition and avoid spurious tripping. In the exemplary embodiment of the invention, the delay is about 20–25 ms. The signal generated by the breaker auxiliary switch 25 is provided to the trip unit 21. In addition, a selector switch auxiliary switch 27, mechanically connected to the selector switch 13, provides an indication of the condition of the ground selector switch 13. This switch 27, which is closed when the selector switch 13 is in the ground position also provides a signal to the trip unit 21.

While shown in single line for clarity, the electrical system, including the main bus 3 and distribution bus 5 as well as the circuit breaker including its main contacts 17 and current detector 23, and the selector switch 13 can all be multi phase, and particularly three phase. In addition, redundant breaker auxiliary switches 25 and selector switch auxiliary switch 27 can be provided for reliability. The trip circuit 21, current detector 23, breaker auxiliary switch 25, selector switch auxiliary switch 27 and trip actuator 19 form a protection circuit 28, which controls opening of the main contacts 17 of the circuit breaker 7 under conditions specified below.

The trip unit 21 provides conventional overcurrent and short circuit protection, and in addition, provides protection during servicing on the distribution bus 5. When such service is to be performed, the ground selector switch 13 is placed in the second condition, that is with the blade in the ground position shown in FIG. 1, with the main contacts 7 of the circuit breaker open. The main contacts 17 of the circuit breaker are then closed. This grounds the distribution bus 5 to provide a safe condition for personnel to work on the distribution bus. However, as mentioned, it is possible that the distribution bus 5 could be energized from another point. For instance, the distribution bus 5 could be double fed through another circuit breaker which is not open, could be back fed through a transformer, or could be energized due to some other error.

If the distribution bus 5 is energized through some other source when the circuit breaker 7 is closed with the ground selector switch in the ground position, the trip unit 21 responds by generating a trip signal which actuates the trip actuator 19 without any intentional delay to open the main contacts 17, and therefore, terminate the fault to ground through the circuit breaker and ground selector switch. However, if no current flows when the circuit breaker main contacts 17 are closed with the ground switch in the ground position, a safe condition is established for personnel to work on the distribution bus. Should the distribution bus 5 subsequently be energized by another source, causing current to begin to flow through the circuit breaker main contacts 17 and the ground selector switch 13 to ground, it is not desirable to trip the main contacts open so that the distribution bus 5 is maintained at ground potential. If the main contacts 17 were opened in response to a later established current while workers were servicing distribution bus 5, they could be exposed to a high potential which would pose a threat to their safety.

The delay in operation of the breaker auxiliary switch 25 in response to the closing breaker main contacts 17, provides the trip unit 21 the intelligence needed to differentiate between the condition where the circuit breaker is closed in on a current when the ground selector switch is in the ground position, and the situation where the circuit breaker main contacts have been closed for a period of time with the ground selector switch in the ground position.

Figure 2:
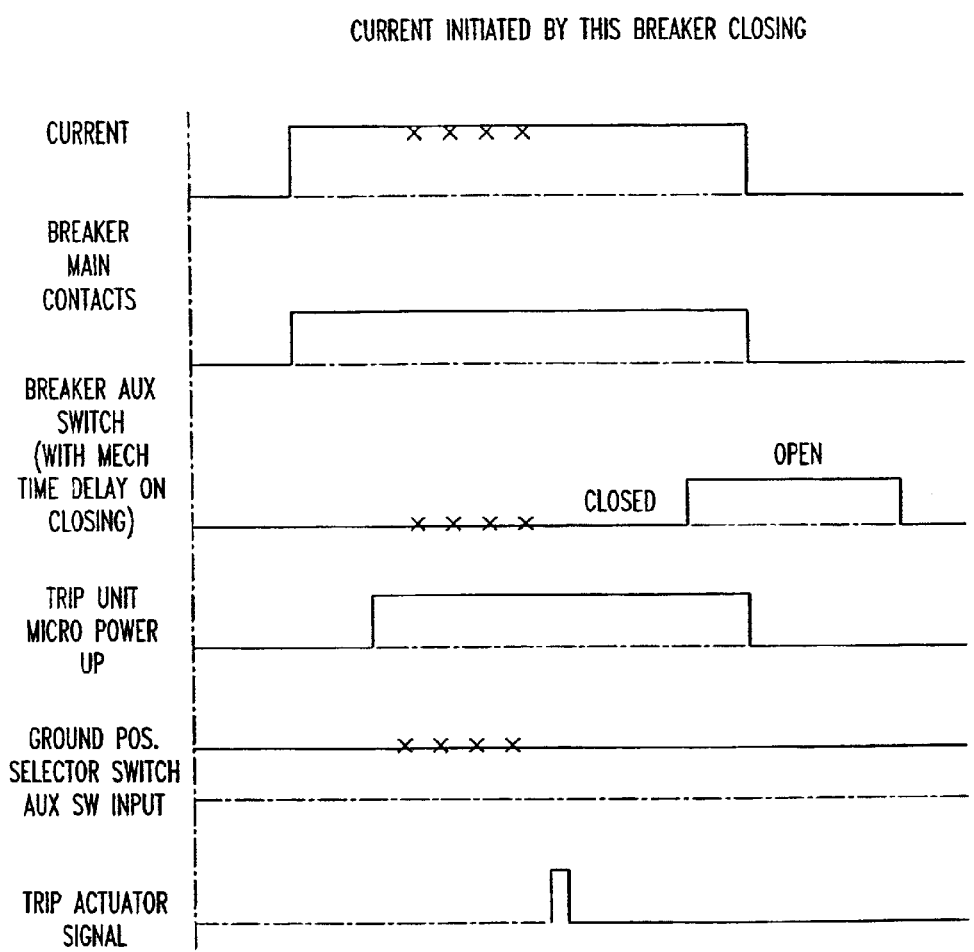
FIG. 2 is a timing diagram for the apparatus of FIG. 1 under conditions in which the circuit breaker is closed in on a current with the ground selector switch in the ground position.

FIG. 2 is a timing diagram for various parameters for the situation in which current is initiated by closing of the breaker 7. Thus, as seen by the first two traces, current begins to flow as soon as the main contacts close. In this particular breaker, the auxiliary switch 25 is closed when the breaker main contacts 17 are open. Due to the mechanical time delay in this switch 25, it remains closed after the main contacts 17 have closed as shown by the third trace. The microprocessor implemented trip unit 21 is powered by the current. Thus there is a delay in the start up of the trip unit as indicated by the fourth trace in FIG. 2. Once the trip unit is powered up, it begins sampling the current signal provided by the current sensor 23, the condition of the breaker auxiliary switch 25, and the condition of the ground selector switch auxiliary switch 27. In the exemplary trip unit 21, samples are taken at the rate of eight per cycle, or approximately every 2 ms. This sampling rate is arbitrary and other rates can be used. The cited conditions are monitored for a predetermined number of samples to eliminate nuisance-tripping resulting from transient conditions. In the example shown, four samples are taken before the trip actuator signal is generated. As can be seen from FIG. 2 for each of these four samples current is flowing, the ground position selector auxiliary switch 27 is closed indicating that the switch is in the ground position, and the breaker auxiliary switch 25 is closed, indicating that the breaker main contacts 17 have just closed. It can be seen from FIG. 2, that there is a mechanical time delay following the trip actuator signal before the main contacts open to terminate current flow. It can also be seen in the example that the breaker auxiliary switch 25 transfers to the open condition indicating that the main contacts 17 have been closed for the selected time interval established by the mechanical delay before the trip signal reopens the main contacts. However, it is not relevant whether the breaker auxiliary switch 25 responds before the main contacts reopen. The operative parameter is that the breaker auxiliary switch 25 remained closed for the selected time interval in this case the time required to take four samples after the main contacts 17 closed.

FIG. 3 illustrates the states of the selected parameters during sampling under the conditions prevailing in the scenario depicted in FIG. 2. It can be seen that the status of the ground selector switch is initialized to all zeros and that of the breaker auxiliary switch is initialized to all ones at power up of the trip unit microprocessor. At that point the current has not yet been detected and no trip signal has been generated. At the first sample, the first digit of the selector switch is changed to a one indicating that the selector switch was in the ground position. Likewise, the first digit of auxiliary switch status is changed to a zero indicating that the auxiliary switch remains closed. Also on the first sample the current is detected but no trip signal is yet generated. As these conditions prevail on subsequent samples, by the fourth sample the selector switch status has changed to all ones while the auxiliary switch status has changed to all zeros and a trip signal is generated.

Figure 4:
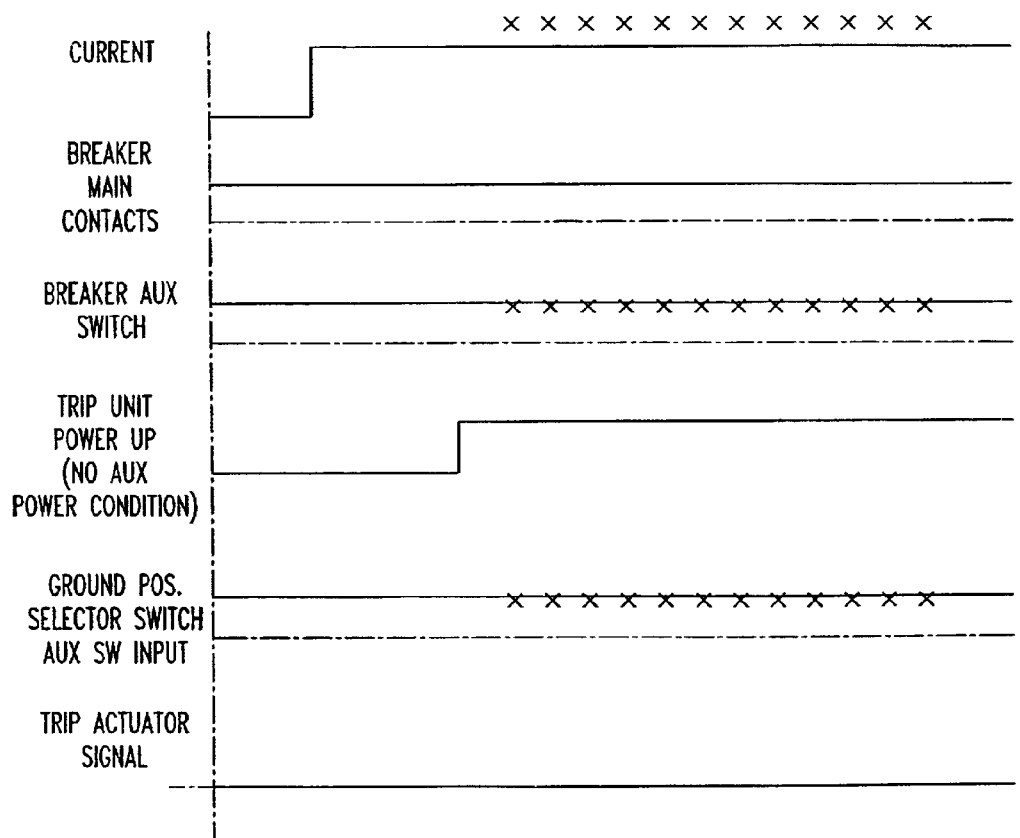
FIG. 4 is a timing diagram similar to FIG. 2 but for conditions where current begins to flow after the circuit breaker has been closed for a selected time interval.

FIG. 4 illustrates the timing for the situation where the current is not initiated by closing of the circuit breaker 7. In this case, the breaker main contacts 17 have been closed long enough that the breaker auxiliary switch 25 has opened. Thus, when the current, initiated by another source, begins to flow as shown by the first trace, the ground position selector switch 27 is closed as shown by the fifth trace and breaker auxiliary switch 25 is open as shown by the third trace. As a consequence, when the trip unit powers up and begins taking its samples, the breaker auxiliary switch is open because the main contacts have been closed for longer than the delay time of the breaker auxiliary switch, and a trip signal is never generated as indicated by the bottom trace in FIG. 4.

FIG. 5 illustrates the status of the listed parameters for the situation described in FIG. 4 in which the circuit breaker has been closed for the selected time interval set by the delay time of the breaker auxiliary switch 25 when current begins to flow. Thus, again at power up, the selector switch status is all zeros while the auxiliary switch status is all ones and the current is not yet detected. At the first sample the selector switch 13 is detected to be in the ground position so that the first digit of its status is changed to one. However, as the auxiliary switch 15 is open at this point, indicating that the main contacts 17 have been closed for the delay period of the auxiliary switch, its status does not change. The current of course is detected on the first sample. But no trip signal is generated. As the same conditions prevail on subsequent samples, the selector switch status changes to all ones by the fourth sample but the auxiliary switch status remains all ones and even though current is detected no trip signal is generated.

Figure 6:
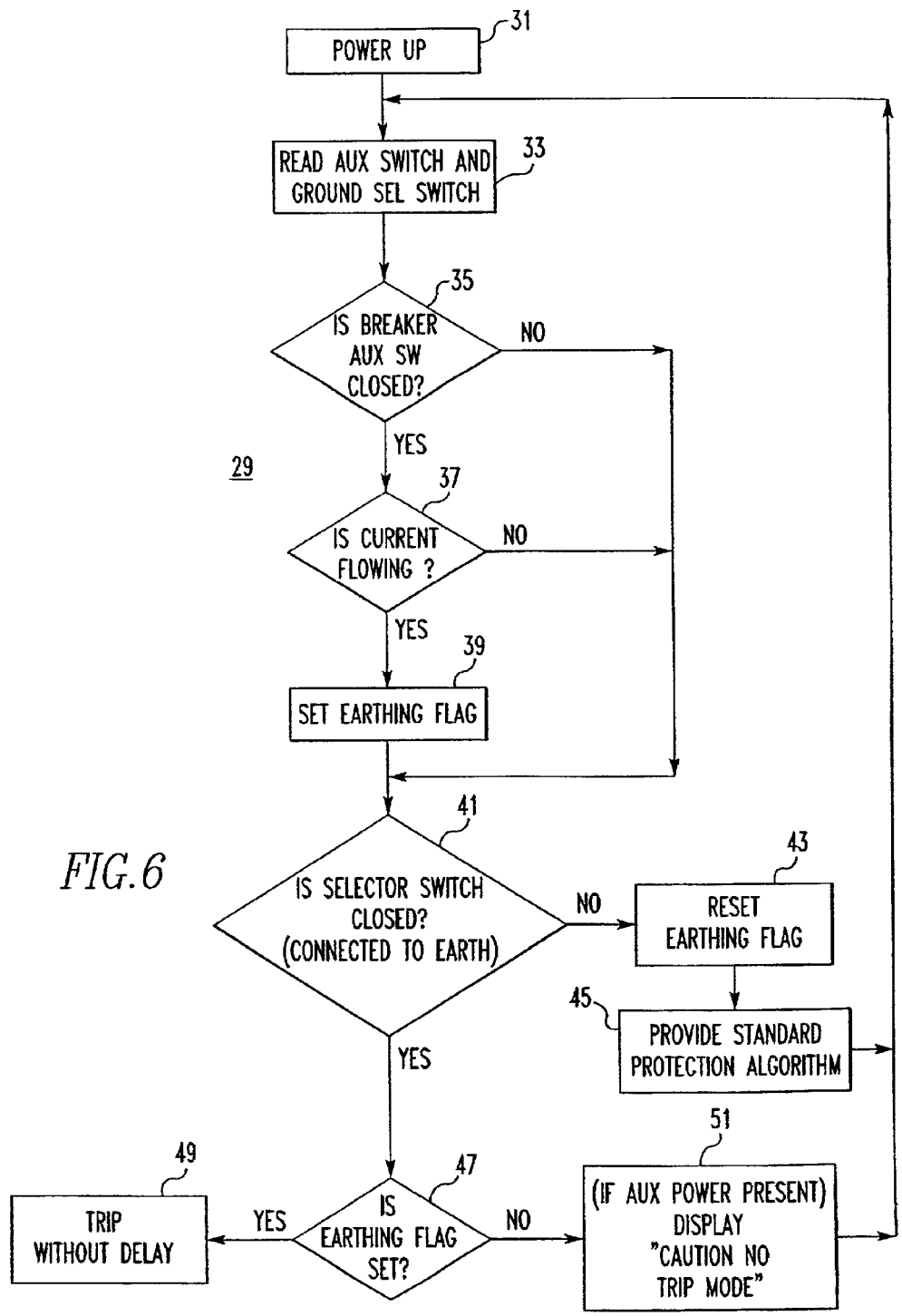
FIG. 6 is a flow chart of the logic implemented by the trip circuit which forms part of the apparatus of FIG. 1.

FIG. 6 is a flow chart of the routine 29 run by the microprocessor of the trip unit 21 to implement the described logic. Thus, at power up indicated at 31, the status of the selector switch 13 and the breaker auxiliary switch 25 are initialized to the values indicated in FIGS. 3 and 5. The breaker auxiliary switch 25 and the ground selector switch 13 inputs are then read at 33. Next, a check is made at 35 as to whether the breaker auxiliary switch 25 is closed. As this is the first time though the routine, the breaker auxiliary switch status cannot be "closed" whether or not the switch is physically closed as discussed in connection with FIGS. 3 and 5. Therefore, a check is made at 41 as to whether the selector switch is closed, that is connected to earth. Again, as this is the first pass the status of the selector switch cannot be "closed" regardless of the physical position of the switch. Thus, the earthing flag is reset at 43 and the trip unit performs the standard protection algorithm for overcurrents and short circuits at 45.

The program then loops back to block 33 where another set of samples is taken. As the same conditions prevail, that is the breaker auxiliary switch 25 and the selector switch 13 cannot yet have a closed status, the same loop is completed as for the first sample. When the fourth sample is taken at 33, if the breaker auxiliary switch is closed at 35 and current is detected as flowing at 37, then the earthing flag is set at 39 to indicate that the breaker has closed in on a current. If the selector switch is not closed at 41, indicating it is not in the ground position, then the earthing flag is reset at 43 and the normal protection algorithm is run at 45 as discussed above. However, if after the fourth sample the selector switch is detected as being closed at 41 and the earthing flag is set as determined at 47 then a trip signal is generated at 49 without delay. Again, this is the situation where the closing of the circuit breaker has initiated current flow with the ground selector switch in the ground position.

On the other hand, if at the fourth, or subsequent samples, the breaker auxiliary switch is closed at 35 but no current is flowing at 37 so that the earthing flag is not set at 39, but the status of the selector switch now indicates at 41 that it is closed, then a "caution no trip mode" will be displayed by the trip unit at 51. This warning can only be generated if there is auxiliary power present to operate the trip unit microprocessor as there is no current flowing through the circuit breaker to power the trip unit otherwise. After the breaker has been closed longer than the delay time of the breaker auxiliary switch so that the breaker auxiliary switch is not closed at 35 but the selector switch is closed at 41, no trip signal will be generated because the earthing flag will not be set at 47. Again, the "CAUTION NO TRIP MODE" warning will be generated at 51 only if there is auxiliary power. This latter situation occurs where the circuit breaker has been closed longer than the selected delay time of the breaker auxiliary switch without initial detection of any current. Even if current subsequently flows, this breaker will remain in the closed state.

It can be seen from the above description that the invention embraces the method of protecting personnel servicing a distribution bus by grounding a circuit breaker through which the distribution is fed from a main bus, on the main bus side of the circuit breaker and then closing the circuit breaker. If current is detected flowing through the main contacts of the circuit breaker within a selected time interval after the circuit breaker is closed, the main contacts are re-opened without delay. On the other hand, if no current is detected for the selected time interval after the main contacts have closed, then the main contacts are not re-opened even if a current should be detected after the selected time interval even though the ground selector switch is in the ground position.

Hence, as can be seen from the above description, the connection of the distribution bus to ground will only be interrupted if current is detected on initial closing of the circuit breaker. Also, it can be seen that the interruption is performed by circuit breaker and not the ground selector switch. Thus, the ground selector switch does not have to be designed to interrupt the large fault current which will occur if the distribution bus is energized while connected to ground. Instead, the interruption is performed by the circuit breaker which is more capable of interrupting such large fault currents. In addition, the circuit breaker main contacts are opened while the current is flowing so that the contacts do not become welded or develop a rough surface. Furthermore, with the intelligence applied by the trip unit, a safe condition is automatically maintained by disconnecting the distribution bus from the ground connection if it is already energized when the ground connection is made, but not disconnecting the distribution bus from ground if the proper ground has been established to protect personnel who might be working on the grounded distribution bus.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the claims appended and any and all equivalents thereof.

What is claimed is:

1. Apparatus for providing protection during servicing of a distribution bus powered from a main bus, the apparatus comprising:

a circuit breaker having main contacts and adapted to be connected to the distribution bus; and an earthing switch connected to the circuit breaker and adapted to be connected to the main bus and having a first condition in which the circuit breaker is connected to the main bus and a second condition in which the circuit breaker is connected to ground;

the circuit breaker including a protection circuit operative with the earthing switch in the second condition to open the main contacts only if current flows through the main contacts within a selected time period after the main contacts close.

2. The apparatus of claim 1 wherein the protection circuit comprises an auxiliary switch having a first condition when the main contacts are open and switching to a second condition a selected time after the main contacts close, a current detector detecting current flowing through closed main contacts, a trip circuit responsive to the earthing switch being in the second condition, the auxiliary switch being in the first condition and detection of current by the current detector to generate a trip signal without delay, and an operating mechanism opening the main contacts in response to a trip signal.

3. The apparatus of claim 2 wherein the trip circuit includes means periodically sampling the condition of the earth switch, the condition of the auxiliary switch, and the current detected by the current detector, and generating a trip signal only after a predetermined number of samples in which the earth switch is in the second condition, the auxiliary switch is in the first condition and current is detected.

4. The apparatus of claim 3 wherein the trip circuit generates the trip signal for the predetermined number of samples which occur in less than one cycle of the current.

5. The apparatus of claim 4 wherein the trip circuit generates a trip signal for the predetermined number of samples occurring in about one-half cycle.

6. The apparatus of claim 2 wherein the trip circuit is energized by the current detector.

7. A method of providing protection for servicing a distribution bus connected to a main bus through main contacts of a circuit breaker, comprising:

connecting the circuit breaker to ground rather than the main bus with the main contacts open;

closing the main contacts so that the distribution bus is connected to ground through the main contacts of the circuit breaker; and opening the main contacts of the circuit breaker without delay when current flows through the main contacts within a selected time period after the closing of the main contacts.

8. The method of claim 7 wherein opening of the main contacts is blocked if current begins to flow through the main contacts only after the selected time period after the main contacts are closed.

9. The method of claim 8 wherein the blocking of the opening of the main contacts further includes providing a warning signal indicating that current has begun to flow only after the selected time period after closing of the main contacts.

* * * * *